(12) United States Patent
Thierry et al.

(10) Patent No.: US 6,995,233 B2
(45) Date of Patent: Feb. 7, 2006

(54) PROCESS FOR MANUFACTURING POLYAMIDES

(75) Inventors: Jean-Francois Thierry, Francheville (FR); Matthieu Helft, Lyons (FR)

(73) Assignee: Rhodianyl, Boulogne Billancourt Cedex (FR)

(*) Notice: Subject to any disclaimer, the term of this patent is extended or adjusted under 35 U.S.C. 154(b) by 0 days.

(21) Appl. No.: 10/398,250

(22) PCT Filed: Oct. 3, 2001

(86) PCT No.: PCT/FR01/03045

§ 371 (c)(1),
(2), (4) Date: Aug. 25, 2003

(87) PCT Pub. No.: WO02/28942

PCT Pub. Date: Apr. 11, 2002

(65) Prior Publication Data

US 2004/0019179 A1    Jan. 29, 2004

(30) Foreign Application Priority Data

Oct. 4, 2000 (FR) .................................. 00 12678

(51) Int. Cl.
*C08G 69/26* (2006.01)
*C08G 69/28* (2006.01)
*C08G 69/08* (2006.01)

(52) U.S. Cl. ............... 528/310; 528/312; 528/322; 528/332; 528/335; 528/336; 528/338; 528/339; 528/340; 528/480; 528/491; 528/499

(58) Field of Classification Search ................ 528/310, 528/312, 322, 332, 335, 336, 338, 339, 340, 528/480, 491, 499
See application file for complete search history.

(56) References Cited

U.S. PATENT DOCUMENTS

| 5,339,255 | A |   | 8/1994 | Suzuki et al. |  |
| 5,532,487 | A | * | 7/1996 | Brearley et al. | 250/339.12 |
| 5,665,854 | A | * | 9/1997 | Kosinski et al. | 528/336 |
| 5,674,974 | A | * | 10/1997 | Brearley et al. | 528/340 |
| 6,169,162 | B1 | * | 1/2001 | Bush et al. | 528/310 |
| 6,327,521 | B1 | * | 12/2001 | Prober | 700/269 |
| 6,489,435 | B2 | * | 12/2002 | Tanaka et al. | 528/310 |
| 6,610,816 | B2 | * | 8/2003 | Kurose et al. | 528/310 |
| 6,696,544 | B1 | * | 2/2004 | Thierry et al. | 528/310 |

* cited by examiner

*Primary Examiner*—P. Hampton Hightower
(74) *Attorney, Agent, or Firm*—Buchanan Ingersoll, P.C.

(57) ABSTRACT

The invention relates to a continuous process for manufacturing polyamides. The polyamides are of the type obtained from diacids and diamines. The process comprises an operation of continuous mixing of a compound which is rich in amine end groups and a compound which is rich in acid end groups and a polycondensation operation using the mixture. The invention relates to the starting phase of such a process, during which an aqueous solution comprising a mixture of monomers in substantially stoichiometric proportions is used.

20 Claims, 4 Drawing Sheets

PROCESS FOR MANUFACTURING POLYAMIDES

Figure 1:
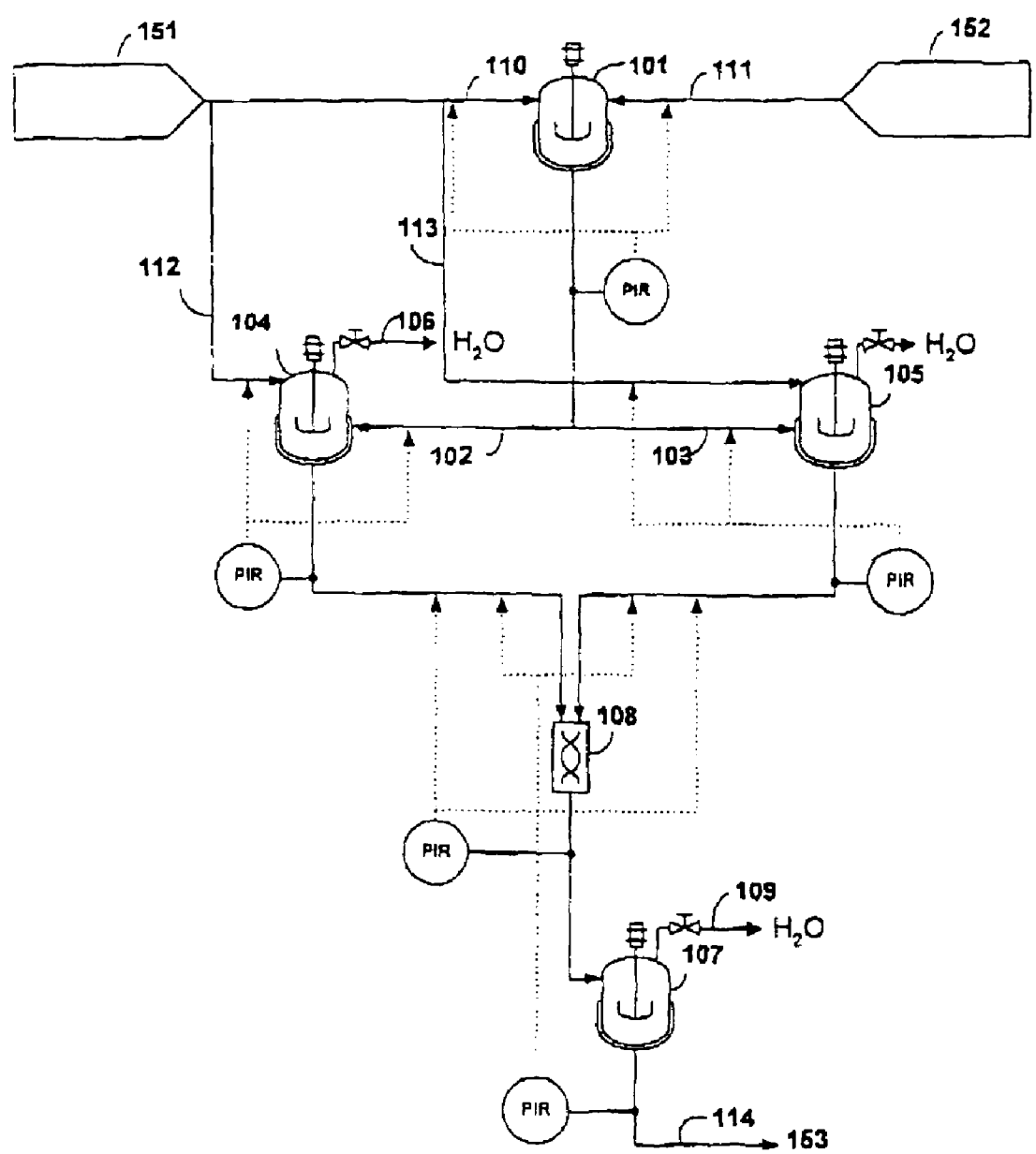

The present invention relates to a continuous process for manufacturing polyamides. The polyamides are of the type obtained from diacids and diamines. The invention relates more particularly to the starting phase of processes for manufacturing polyamides.

Polyamides are polymers of major industrial and commercial interest. Thermoplastic polyamides are obtained either by reaction between two different monomers or by polycondensation of a single monomer. The invention applies to polyamides obtained from two different monomers, the most important polyamide of which is poly(hexamethylene adipamide). Obviously, these polyamides may be obtained from a mixture of diacids and diamines. Thus, in the case of poly(hexamethylene adipamide), the main monomers are hexamethylenediamine and adipic acid. However, these monomers may comprise up to 25 mol % of other diamine or diacid monomers or even amino acid or lactam monomers.

This category of polyamides derived from two different monomers is generally manufactured using, as starting material, an amino acid salt obtained by mixing a diacid with a diamine in stoichiometric amount and in a solvent such as water.

Thus, in the manufacture of poly(hexamethylene adipamide), adipic acid is mixed with hexamethylenediamine in water to obtain a hexamethylenediamine adipate, which is more commonly known as Nylon salt or "N salt".

The solution of N salt is optionally concentrated by evaporating off the water.

The polyamide is obtained by heating such a solution of Nylon salt at high temperature and pressure to evaporate off the water, while at the same time avoiding any formation of solid phase to avoid the mixture setting to a solid.

This operation consumes a large amount of energy, and also does not make it possible to control the stoichiometry entirely since the amine may be evaporated or entrained with the water. Such an entrainment or evaporation requires control of the process to re-establish the stoichiometry, and may be an inconvenience since the diamine entrained may contaminate the effluents discarded from the production plant.

In addition, the need to heat to a high temperature under a high pressure may cause the formation of degradation compounds which adversely affect the performance qualities of the manufactured polyamide, especially as regards the mechanical characteristics and its colour.

To avoid the use of large amounts of water, certain processes for preparing a polyamide without water and without solvent have already been proposed. Mention is made of documents WO 96/16107, WO 99/61511 and WO 00/77075.

Processes described in these documents comprise the following steps:
- continuous mixing of two flows of polyamide precursors, one flow rich in acid end groups, and one flow rich in amine end groups,
- condensation using the mixture of the two flows,
- the mixing and condensation being carried out in the same plant or in different plants,
- recovery of a flow of product obtained from the condensation operation,
- at least one of the flow rates of the flows of precursor being coupled to the result of the analysis of the contents of acid and amine end groups in the mixture, the condensation medium or the recovered flow, so as to keep these contents and/or their ratio between two nominal values.

More specifically, document WO 99/61511 describes a process in which adipic acid (AdOH) melt is mixed with hexamethylenediamine (HMD) in liquid form or as a highly concentrated solution. The mixture is introduced into a recycling reactor fitted with heating means. The monomer flows are coupled to the analysis of the amount of acid end groups and amine end groups in the compound obtained. One analysis method described is Near InfraRed (NIR) spectroscopy. The starting phase of the process, that is to say the operations preceding the establishment of a permanent regime, is not described.

Document WO 00/77075 mentioned above describes the mixing of two flows of desequilibrated mixtures M2 and M3, each respectively comprising more and less of diacid than of diamine, in diacid/diamine ratios of between 1.005 and 1.2 and between 0.8 and 0.995, respectively. One analysis method described is also Near InfraRed (NIR) spectroscopy. The mixtures M2 and M3 may be obtained, respectively, by mixing a diacid/diamine mixture, with a composition in the region of 81:19 by mass and of a diamine: this diamine is introduced, respectively, in deficit and in excess relative to the amount of diacid in the mixtures M2 and M3. The starting phase of the process is not described.

The performance qualities of the processes described above, especially as regards the quality of the polyamide and the production efficiency, are linked to their regulation, by metering the product obtained and coupling the flows of precursors to this monitoring. As long as the product recovered does not comply with the specifications, the material used is considered as being lost. This has a great influence on the viability of the process. The starting phase, as far as the production of a satisfactory regulation and permanent regime, with an exiting product which complies with specifications, is thus of great importance. In addition, the further the product obtained from the starting phase is removed from the point of functioning, the longer and/or more difficult the regulation is to obtain. This is particularly true in the context of monitoring by NIR spectrometry, which is sensitive, requiring a prior calibration by physical, chemical or physicochemical analysis methods. Regulation using this method, which moreover has other advantages, for obtaining a point of functioning which is remote from the starting point, may prove to be long.

The observation cannot be avoided that the prior art does not contain any teaching regarding the starting procedures for processes for the continuous manufacture of polyamide using a mixture of two flows of precursors, one rich in diacids and the other rich in diamines.

The object of the present invention is to propose a process for manufacturing polyamide, comprising a starting phase that is particularly advantageous in many respects. It makes it possible to produce tailings in plants, preventing phenomena of precipitation, crystallization, degradation or unwanted heterogeneity; it makes it possible to achieve a rapid and satisfactory regulation; it makes it possible to avoid large losses of material, the product then leaving the starting phase being a polyamide obtained according to a process related to a common process starting with an aqueous solution of a stoichiometric diacid/diamine salt.

To this end, the invention proposes a process for the continuous manufacture of polyamide, using dicarboxylic acids and diamines, comprising the steps described above in a permanent regime, and the starting phase of which comprises the following steps:

Step 1:
- feeding the condensation plant with an aqueous solution comprising dicarboxylate ions and diammonium ions, in proportions such that their molar ratio is between 0.99 and 1.01 and preferably between 0.995 and 1.005,
- establishment of the operating regime in the condensation plant under temperature and pressure conditions such that there is condensation starting with the dicarboxylate ions and the diammonium ions initially included in the aqueous solution, Step 2: recovery of a flow of the condensation product Step 3: supplying a flow of precursors and activating the analysis and the coupling.

The polyamide is of the type obtained from monomers of dicarboxylic acid type and from monomers of diamine type.

The expression "precursor rich in acid end groups" may be understood as meaning:
- monomers of the pure diacid type (that is to say free of monomers of diamine type), in solid or melt form, or as a concentrated solution (optionally in ionized form),
- mixtures of monomers of diacid type and of monomers of diamine type, in non-stoichiometric proportion, comprising more monomers of diacid type than monomers of diamine type, in melt form and/or in the form of a concentrated solution (optionally in ionized form),
- amidation products, obtained from mixtures of monomers of diacid type and of monomers of diamine type, with an amount of acid end groups which is greater than the amount of amine end groups, preferably with a degree of polymerization of less than 20.

The expression "precursor rich in amine end groups" may be understood as meaning:
- monomers of pure diamine type (that is to say free of monomers of diacid type), in solid or melt form, or in the form of a concentrated solution (optionally in ionized form),
- mixtures of monomers of diacid type and of monomers of diamine type, in non-stoichiometric proportion, comprising more monomers of diamine type than monomers of diacid type, in melt form and/or in the form of a concentrated solution (optionally in ionized form),
- amidation products, obtained from mixtures of monomers of diacid type and of monomers of diamine type, with an amount of amine end groups which is greater than the amount of acid end groups, preferably with a degree of polymerization of less than 20.

In a permanent regime, the process comprises at least one operation of mixing a flow of a precursor which is rich in diacid end groups, and a flow of a precursor which is rich in diamine end groups. The mixing operation may be carried out in a plant specially designed for this purposes, for example in a static mixer zone. It may be carried out in a plant in which other operations are also carried out, for example a condensation operation. It may be, for example, a stirred reactor or a recycling reactor in which the two flows are simultaneously introduced. The plant in which the mixing is carried out is referred to as the mixing plant.

The mixture is subjected to a condensation operation, that is to say an operation during which monomers or oligomers react to form macromolecular chains, or polyamide oligomers. During this operation, the degree of polycondensation increases. The condensation operation is generally carried out at temperatures above 180° C. and at a pressure above 5 bar, preferably at temperatures above 220° C. and at a pressure of between 5 and 20 bar. The pressure indications of the present invention are absolute pressures, opposed to relative pressures. The condensation product preferably has a degree of polycondensation of greater than 10, preferably of greater than 20. The product obtained from this operation may be referred to as a prepolymer, if its degree of polycondensation does not exceed 100. The plant, or plants, in which the condensation is carried out is(are) referred to as the condensation plant(s). If the plants in which the mixing and condensation are performed are the same, the said plant is referred to as the mixing plant or condensation plant depending on the operation under consideration.

A flow of the product obtained from the condensation operation is recovered. In a permanent regime, the flow rate of material obtained from this flow is substantially equal, in terms of amount of material, to the sum of the flow rates of the flows of precursors. The amounts of acid and amine end groups in the product constituting this flow are measured, and at least one of the flow rates of the flows of precursors are coupled to this measurement, such that these amounts remain between two nominal values, and/or are such that the ratio between the amount of acid end groups and the amount of amine end groups is between two nominal values, preferably close to 1. The analysis may also be carried out on the mixture of the flows, or on a product during polycondensation. As a guide, the preferred margin of variation of this molar ratio compared with the desired value is plus or minus 0.0005.

One particularly advantageous analysis method for carrying out the process is Near InfraRed spectrometry. This technique for determining a property of a polymer has been described, for example, in U.S. Pat. No. 5,532,487 and WO 96/16107. Thus, in U.S. Pat. No. 5,532,487, the method of spectrometric analysis by Near InfraRed is used to determine the concentrations of the acid and amine end functions in a polyamide in solid form, for example on a yarn, or on anhydrous diacid/diamine mixtures.

Similarly, patent WO 96/16107 describes the use of a Near InfraRed spectrometric analysis method to determine the concentration of acid and/or amine end functions in a polyamide melt leaving a reactor. However, in these two examples, the polyamide analysed is substantially anhydrous.

In one particular embodiment of the invention, this determination of the concentration of acid and/or amine end functions is performed by analysis of the reaction mass containing the water resulting from the amidation reaction, for example in a branch loop of the main flow, in an optional branch of the main flow in a recycling loop of a reactor.

Depending on the degree of polycondensation of the product recovered, this product may be introduced into flashing and/or finishing plants, in order further to increase the said degree of polycondensation. The flashing operation is intended to return the product to atmospheric pressure. It is generally followed by a separation of the water produced during the condensation. The separation may be carried out in a plant which is open to gases, for example a separator of cyclone type. The successive flashing and finishing steps comprise a rapid evaporation of the condensation water contained in the polyamide leaving the polymerization reactor, obtained, for example, by depressurizing the flow of polyamide. The polyamide is then maintained for a given period at a polymerization temperature under atmospheric pressure, or under reduced pressure, to obtain the desired degree of polycondensation.

The plants may furthermore comprise means for conveying the flows of materials, or for placing them under the temperature and pressure conditions mentioned, such as pumps, valves, heat exchangers, pressure monitoring and regulating devices, analysis instrumentation, etc.

In a first starting step of the process, the condensation plant, and optionally the mixing plant, are fed with an aqueous solution comprising dicarboxylate ions and diammonium ions, in molar proportions of between 0.99 and 1.01 and preferably between 0.995 and 1.005. This ratio is very close to the stoichiometry, and the solution is not considered as a precursor which is rich in acid or amine end groups. It may be, for example, an aqueous hexamethylenediammonium adipate solution, at a weight concentration of between 40% and 65%. This first feed is carried out so as to fill the plants at least partially. Valves for cutting the recovery of the products before the condensation plants may be closed during this first feed. The feed may comprise several phases, for example a phase of preliminary feeding with water, followed by a phase of feeding with a solution comprising ions, or with a salt in solid form, or with acid and amine monomers, in order to obtain the solution. The stoichiometry of the dicarboxylate and diammonium ions may be controlled, for example, by pH measurement or by Near Infra-Red spectrometry.

After feeding in the solution, the operating temperature and pressure are established in the condensation plant such that there is condensation starting with the ions initially included in the solution.

In the embodiment for which the acid monomer is adipic acid and the amine monomer is hexamethylenediamine, the solution comprising the hexamethylenediammonium salt is preferably heated to a temperature above 180° C. and to a pressure above 5 bar. This operation is advantageously carried out in a reactor under pressure. The plants may comprise devices specially intended for carrying out this phase, such as devices for removing the water, and/or for working under pressure. Such conditions, depending on the types of plant, are known to those skilled in the art.

During a second step, a flow of product obtained from the condensation is recovered from the solution. According to one advantageous mode, the product recovered has contents of acid and amine end groups that are very close to those intended in a permanent regime.

It is pointed out that the phases of feeding with solution and of condensation from the solution may be carried out on continuous flows. The flows of solution or of condensation product still not corresponding to the desired level of condensation may be removed, stored or reintroduced into the plants. These flows do not correspond to the flows recovered from the condensation product.

During a third step, the operations allowing the process to function in a permanent regime are carried out. Thus, the plants are fed, optionally via a mixing plant, with a flow of precursors, and the system for analysing and coupling at least one of the flow rates of these flows is activated. The feeding with a flow of precursors and the activation of the analysis and coupling may be successive or simultaneous. The analysis is advantageously carried out by Near InfraRed spectrometry. According to one advantageous process, at least some of the flow of condensation product from the solution is recovered and used to calibrate the Near InfraRed spectrometer in the desired range of contents of end groups and/or of ratios of contents, the feeding with two flows, the analysis and the coupling being activated after this operation. To this end, the method of dosed additions may be carried out: known amounts of diacid and/or of diamine are added to the product and the spectrometer is calibrated on the response obtained.

The feeding with a flow of precursor may be understood as the feeding of a precursor prepared beforehand in another plant. It may also be understood as the activation of a system of analysis of a flow and of coupling parameters for preparing the flow to this analysis. The flow fed in may thus change gradually from a flow of product which is not considered as the precursor in permanent regime to a flow of product constituting the precursor.

In the course of time, the product recovered changes gradually from a product obtained by polycondensation mainly from the aqueous solution to a product obtained by polycondensation mainly from the mixture of the two flows of precursors. This process makes it possible rapidly to achieve a regulation of the process in a permanent regime, without any loss of product, the product recovered at the start of the process relating to a polyamide obtained from a salt solution, in substantially stoichiometric proportions.

It is pointed out that the second and third steps may be performed simultaneously or successively.

As mentioned above, in the course of the second step, there is a gradual change from a condensation starting with an aqueous solution of salt to a condensation starting with a mixture of precursors. The condensation conditions may vary substantially during this step. According to one preferential embodiment, the condensation temperature and pressure conditions for step 1 and for the permanent regime are identical.

The process of the invention may be used for the manufacture of poly(hexamethylene adipamide), starting with adipic acid as diacid monomer and hexamethylenediamine as diamine monomer.

The process of the invention also makes it possible to manufacture other polyamides starting with diacid monomers chosen from the group comprising glutaric acid, suberic acid, sebacic acid, dodecanedioic acid, isophthalic acid, terephthalic acid, azelaic acid, pimelic acid or naphthalenedicarboxylic acid, for example.

Diamine monomers which may be mentioned, in addition to hexamethylenediamine, include heptamethylenediamine, tetramethylenediamine, octamethylenediamine, nonamethylenediamine, decamethylenediamine, 2-methylpentamethylenediamine, undecamethylenediamine, dodecamethylenediamine, xylylenediamine and isophoronediamine.

The invention preferentially applies to the manufacture of polyamide from diacid and diamine monomers, at least 80 mol % of which are, respectively, adipic acid and hexamethylenediamine.

It is also possible to prepare polyamides from diacid and diamine monomers comprising a small proportion (less than 20 mol %) of amino acid or of lactam. The manufacture of copolyamide PA 6,6/6 may thus be mentioned, starting with adipic acid/hexamethylenediamine monomers containing a given amount of caprolactam.

According to a first embodiment of the invention, the precursor which is rich in acid end groups is a diacid and diamine melt, with a diacid/diamine molar ratio of between 0.8 and 0.995 and preferably between 0.8 and 0.99; the precursor which is rich in amine end groups is a diacid and diamine melt, with a diacid/diamine molar ratio of between 1.005 and 1.2 and preferably between 1.01 and 1.2. The condensation plants preferably comprise a stirred polymerization reactor.

The functioning of the process in a permanent regime is first described.

The diacid/diamine molar ratio of the precursor which is rich in diacid end groups is preferably between 0.95 and 0.99. The diacid/diamine molar ratio of the precursor which is rich in amine end groups is preferably between 1.01 and 1.05. The plants may comprise flashing and finishing devices downstream of the polymerization reactor.

Preferably, the mixtures constituting the precursors are anhydrous. The expression "anhydrous mixture" should be understood as meaning mixtures which may contain up to 10% by weight of water. The term "anhydrous" is used in the present description as opposed to the conventional process which uses an aqueous solution of Nylon salt in permanent regime.

The mixtures constituting the two flows of precursors may be prepared in reactors, at a temperature advantageously between 100 and 260° C. under a pressure at least slightly above atmospheric pressure, preferably at a temperature of between 220° C. and 260° C. at a pressure of between 5 and 20 bar. The reactors in which the precursors are prepared and also the polymerization reactor may be, for example, reactors with mechanical stirring or reactors with external recycling. In the latter case, the feeding with precursors and/or the removal of the product and/or the heating may advantageously be performed in the recycling loop. The heating of the reactors may be performed using a jacketed device and/or an internal coil. The reactors may furthermore be open to gases.

According to one particular mode, the precursors are prepared by mixing, in the liquid state, a diacid with the diamine, in the presence of a small amount of water, with heating at moderate temperature for a precursor which is rich in diacid or diamine end groups.

According to another particular mode, the precursors are heated at a higher temperature with removal of water to obtain condensation products, oligomers or prepolymers, containing acid end groups for the first precursor and amine end groups for the second precursor. For the manufacture of polyhexamethylene adipamide, the temperature is advantageously between 180° C. and 250° C., under a pressure of between 5 and 20 bar. The degree of polycondensation of the precursors is preferably less than 20. The precursors are then mixed together and introduced into the polymerization reactor, in which the degree of polymerization is increased.

According to one preferred characteristic, the condensation performed in the polymerization reactor is carried out under an autogenous pressure or a pressure regulated to avoid any loss of diamine or at least to reduce the losses to the minimum. According to another characteristic, the plants may comprise means for recovering any diamine volatilized at the same time as the water, and means for introducing the diamine recovered into the polymerization plant.

According to a novel characteristic of the invention, the polymerization performed in the polymerization reactor is carried out under an autogenous pressure or a pressure regulated to avoid any loss of diamine or at least to reduce the losses to the minimum.

The process may be used to manufacture poly(hexamethylene adipamide), starting with adipic acid as diacid monomer and hexamethylenediamine as diamine monomer.

In one preferential embodiment, poly(hexamethylene adipic) (polyamide 6,6) is manufactured, and the precursors are prepared from an adipic acid (AdOH)/hexamethylenediamine (HMD) mixture with a composition in the region of a eutectic mixture, that is to say 19% by weight of HMD and 81% by weight of AdOH. This eutectic mixture has a melting point in the region of 100° C.

The eutectic mixture is introduced into two reactors into which are introduced hexamethylenediamine to obtain, respectively, a first mixture which is rich in diacid (diacid/diamine ratio of between 1.01 and 1.2) and a second mixture which is rich in diamine (diacid/diamine ratio of between 0.8 and 0.99). The process for preparing the eutectic mixture may be analogous to that described in U.S. Pat. No. 4,131,712 for the preparation of acid-rich mixtures.

The eutectic mixture is advantageously prepared in plants upstream of the plants for preparing the precursors. This may be, for example, a plant equipped with stirring and heating means, which may be placed under pressure. Such a plant for preparing the eutectic mixture may be used to feed the two plants (generally reactors) for preparing the precursors.

Advantageously, the diacid/diamine ratios of the precursors are monitored by chemical or potentiometric analyses. In one particularly preferred embodiment, these diacid/diamine ratios are determined by a Near InfraRed spectrometric analysis.

The eutectic mixture may be prepared by mixing adipic acid, in solid or melt form, and hexamethylenediamine, in the pure form or in the form of a concentrated solution, the mixing being performed at temperatures above 100° C., under a pressure which is at least slightly above atmospheric pressure.

The temperature for preparing the precursors is advantageously above 100° C. to obtain an amidation reaction and thus a partially condensed product, containing acid or amine end groups depending on the precursor.

The flows of precursors are collected and introduced into a stirred polymerization reactor. It is possible to include static mixers in the feed pipe of the polymerization reactor and/or a premix reactor.

The flow rate of each flow of precursor is determined so as to obtain a ratio between the amine and acid functions which is as close as possible to the desired value. The flow rate of the flows is monitored and adjusted by coupling it to the result of the analysis of the ratio between the acid and amine functions present either in the reaction mass formed by the mixing of the two flows, for example in the premix reactor or after the static mixers, or in the reaction mass present in the polymerization reactor or at the outlet of the said polymerization reactor.

The adjustment of the flow rates for entry into the various reactors may be carried out by means of pumps or depressurization valves.

In order to obtain an efficient adjustment, analysis of the acid and amine functions is performed continuously by Near InfraRed spectrometric analysis. The coupling may also be combined with measurement of the stoichiometric ratio in the two flows of precursors.

The starting steps preceding the functioning in permanent regime are now described for the first embodiment of the invention described above.

The polymerization reactor and optionally the mixing device, the plants for preparing the precursors and the plants for preparing a eutectic mixture are fed with an aqueous solution comprising bicarboxylate ions and diammonium ions. This is preferably a hexamethylenediammonium solution with a concentration of between 40% and 65% by weight. During the feeding of salt solution, a product recovery valve, downstream of the polymerization reactor, is preferably closed.

During a second step, the salt solution in the polymerization reactor is heated to a temperature above 100° C., under a pressure preferably of between 1 and 10 bar.

The polymerization reactor is fed with a mixture of precursors. In a first variant, the precursors are already prepared, in the respective proportions of the permanent regime. In a second variant, the precursors are not yet prepared on starting the plants, the plants for preparing these precursors containing a salt solution. In the second variant, the proportions of acid monomers and of amines, respectively, for the precursors in the permanent regime are gradually reached by feeding diacids or a eutectic mixture and/or diamine into the plants for preparing the precursors. The precursor mixture then changes gradually from a mixture obtained from salt solutions to a mixture obtained from precursors that are rich in acid and amine end groups, respectively.

The condensation product obtained from the polymerization reactor is recovered and the analysis and coupling system is activated.

For the second variant, the temperature is advantageously between 100 and 180° C., with a pressure of between 1 and 10 bar, such that the salt solution is liquid. A start of condensation may take place in these plants.

When carrying out the second variant, the precursor preparation plants contain a salt solution at the start of the process, the diacid/diamine ratios being substantially equal to 1. These ratios are modified by feeding into the plants different amounts (different flow rates) of diamine-rich compounds and of diacid-rich compounds, into each of the preparation plants. As described above, a diacid-rich compound which is preferred for preparing the precursors is a eutectic mixture.

The eutectic mixture may be prepared in plants upstream of the precursor preparation plants. The plant is, for example, a tank equipped with mixing and heating means. According to one preferential characteristic, the plant for preparing the eutectic mixture is first fed with an aqueous salt solution. The mixture is heated to a temperature of between 100 and 150° C. The plant is fed with diacid, for example in solid form, and optionally with diamine, with feed rates corresponding to the stoichiometry of the eutectic mixture, and the product obtained is removed. The residence time in the plant is preferably chosen such that the diacid, if it is in solid form, has the time to melt and/or dissolve. The temperature in the plant is greater than the melting point of the mixture. It is pointed out that the mixture may contain water, either added continuously, in an amount preferably less than 10% by weight, or obtained from the initial feed of salt solution. Water obtained from the initial feed of salt solution is removed either by evaporation, before feeding in diacid, or by depletion, during the removal of the mixture prepared, on starting the process.

According to a second embodiment of the invention, the precursor which is rich in acid end groups is a dicarboxylic acid melt, the precursor which is rich in amine end groups is a diamine melt or a diamine in concentrated solution. The condensation plants preferably comprise two reactors, a reactor which is not open to gases and a reactor which is open to gases. The plants comprise a mixing plant, for example a zone of static mixers.

In a permanent regime, the two flows are mixed together such that the amounts of diacids and of diamines are equivalent. The plants may comprise devices for ensuring that the diacid is not in contact with oxygen. In the context of manufacturing polyamide 6,6, the diacid is adipic acid, preferably introduced at a temperature close to 170° C., and the diamine is hexamethylenediamine, preferably introduced at a temperature close to 70° C., optionally as a concentrated solution in water (preferably less than 10% water).

The condensation temperature in the reactor that is not open to gases is preferably between 220° C. and 300° C., under a pressure of between 5 and 20 bar. The residence time of the flow of material in the reactor (the flow entering the reactor constituting the mixture) is advantageously between 1 minute and 30 minutes.

According to one advantageous characteristic, the condensation in the reactor is such that only 10% free monomers remains in the flow leaving this reactor.

The flow obtained from the reactor that is not open to gases can then be introduced into a reactor which is open to gases. The residence time of the material in this reactor is advantageously between 1 minute and 60 minutes. The opening of this reactor to gases allows the water obtained from the condensation reaction to evaporate off. The degree of polymerization also increases in this reactor.

A flow of the condensation product is recovered. According to one preferential mode, some of the flow produced is reintroduced into the reactor that is not open to gases, at the temperatures and pressures mentioned above, in the presence of the mixture of precursors. This recycling of the product is preferentially such that the recycling flow is between ten and twenty times greater than the flow of mixture introduced into the reactor which is not open to gases. During this operation, there is condensation from the salt. A recovery valve is opened. The degree of polycondensation at the time of opening of this valve is advantageously greater than 10 and preferably greater than 20.

This recycling can make it possible to obtain sufficiently large degrees of polycondensation, to produce stirring and to heat the material.

The flow obtained from the reactor which is open to gases is analysed in order to determine the amounts of acid and amine end groups. NIR spectrometry is advantageously used to do this. The flows of precursors, diacid melt or diamine are coupled to the analysis of the amounts of end groups and/or their ratio. The ratio between the acid end groups and the amine end groups is preferably close to 1, advantageously with a precision of greater than 0.5. The analyses may also be performed on a recycling flow.

The flow of product recovered may advantageously be introduced into a flashing device and then a finishing device, making it possible further to increase the degree of polymerization.

It is pointed out that the reactor which is open to gases may be provided with means for recovering the diamine monomers which may have volatilized with the water. These monomers may be reintroduced into the plants.

The starting steps preceding the permanent regime described above are now described.

The condensation plants, and optionally mixing plants, are first fed with an aqueous solution of a diacid/diamine salt, preferably an aqueous hexamethylenediammonium solution of from 40% to 65% by weight. This operation constitutes a first step. During a second step, the solution included in the condensation plant, for example a reactor which is not open to gases, is heated to a temperature above 180° C. at a pressure above 5 bar, preferably to a temperature above 220° C. and to a pressure of between 5 and 20 bar. Recycling of the solution is optionally imposed. The salt solution included in the mixing plant is advantageously heated to a temperature of 180° C.

The mixing plant is fed with a flow of precursors, at flow rates such that the proportions of monomers introduced are substantially stoichiometric. The analysis and coupling system is activated. The flow of mixture is fed into the condensation plant, for example the reactor which is not open to gases, and a flow of condensation product is recovered. The material obtained from the mixing of the precursors thus replaces in the plants the material obtained from the solution of N salt. Water is gradually removed either in the reactor which is open to gas, or by depletion with the product recovered.

The permanent regime is thus gradually reached.

Other advantages or details of the invention will emerge more clearly in the light of the examples given below, purely as a guide, and with the detailed descriptions given with reference to the figures, which represent a synoptic scheme of parts of the process according to the invention.

EXAMPLE 1

Example of Functioning of the Process and Its Start-up

The process in permanent regime is first described in this example.

According to the scheme represented in FIG. 1, a concentrated aqueous hexamethylenediamine solution with a concentration by mass of water equal to 10%, available from a source 151, and of adipic acid powder, available from a source 152, is fed continuously into a first stirred reactor 101 via the pipes 110 and 111, respectively, to obtain a mixture whose weight ratio is 81% of diacid monomer and 19% of diamine monomer. This mixture M1 may contain a small amount of water, for example about 7% by weight relative to the diacid monomer/diamine monomer mixture. The mixture is maintained at a temperature of about 126° C.

The mixture M1 is fed by withdrawal from the reactor 101 via the pipes 102 and 103, respectively, into two stirred reactors 104 and 105.

However, in an embodiment which is not shown, the mixture M1 from the reactor 101 may be fed into a storage tank and then from there fed into the reactors 104 and 105 to allow a more flexible execution of the process.

In the example illustrated, the reactor 104 is maintained at 228° C. under a pressure of 15 bar, the flow of mixture M1 fed via the pipe 102 is 41 kg/h. Into this reactor 104 is fed a solution of hexamethylenediamine (HMD) containing 10% water via the pipe 112 at a flow rate which is controlled to obtain in the reactor 104 a mixture M2 comprising a ratio of the acid functions relative to the amine functions equal to 1.03.

The acid/amine ratio is measured continuously in the reactor 104 or, as illustrated, at the outlet of this reactor by a Near InfraRed analysis method described below. The result of this analysis is processed by a coupling system which controls the flow rates of the flows of mixture M1 and of HMD solution fed into the reactor 104.

In FIG. 1, the dashed lines represent, on the one hand, the couplings of the flows to the Near InfraRed measurements, and, on the other hand, the analyses of the compositions of the flows by Near InfraRed.

The residence time of the mixture in the reactor 104 is about 48 minutes. The reactor 104 comprises an outlet 106 for removing the water contained and/or formed in the reactor. The rate of removal of this water in the form of steam is 7.6 kg/h.

The mixture M2 removed from the reactor 104 is a preamidated adipic acid/HMD mixture which is rich in acid functions.

A second preamidated adipic acid/HMD mixture M3 is produced in the reactor 105, in a similar manner to the production of the mixture M2 in the reactor 104. However, the flow rate of the flows of mixture M1 and of hexamethylenediamine solution fed via the pipe 113 are determined and monitored so as to obtain in the reactor 105 a mixture with a ratio of the acid functions relative to the amine functions equal to 0.98.

In the example illustrated, the temperature and pressure conditions are identical to those in the reactor 104.

As for the manufacture of the mixture M2, the flow rates of the flows of mixture M1 and of HMD are coupled to the result of the continuous measurement of the acid function/amine function ratio in the mixture M3, by a Near InfraRed analysis method described below.

The two mixtures M2 and M3 obtained from the reactors 104 and 105, respectively, are introduced into a polycondensation reactor 107, maintained at a temperature of 248° C. under a pressure of 17.5 bar absolute.

The two flows of mixture M2 and M3 are fed into a premixer 108 consisting, in the example, of an assembly of static mixers arranged in a pipe. Other mixing means, such as a stirred tank, may be used.

The flow rates of the flows of mixtures M2 and M3 are monitored so as to obtain in the reactor 107 a mixture with a given acid function/amine function ratio depending on the characteristics of the polyamide to be manufactured.

Thus, in the example illustrated, these flow rates are determined so as to obtain a mixture in the reactor 107 which has a difference between the concentrations of acid and amine functions (CEG–AEG) at the outlet of the reactor 107 in the region of 50 meq/kg.

This difference in concentrations, or the acid function/amine function ratio, is measured continuously by means of a Near InfraRed spectrometric analysis method, the flow rates of the flows of mixture M2 and M3 fed into the premixer 108 being coupled to this measurement so as to maintain the difference value between two nominal values.

The residence time of the mixture or prepolymer in the reactor 107 is in the region of 30 minutes.

The reactors 104, 105 and 107 are equipped with a depressurization valve 106, 109 to allow some of the water formed by the amidation reaction to be removed. The flow of steam removed via the depressurization valve 109 is equal to 4.5 kg/h on average. The analysis and monitoring of the composition of the flow 114 removed from the reactor 107 allows the progress of the amidation reaction and thus the degree of polycondensation of the prepolymer removed from the reactor 107 to be monitored.

The average rate of removal of the prepolymer from the reactor 107 via the pipe 114 is 102 kg/h. The prepolymer thus recovered has a number-average molar mass in the region of 3800 and contains about 5% water. Its viscosity index measured in dilute formic acid in accordance with the conditions and recommendations of the international standard ISO 307-1984 is 33.5 ml/g.

The process illustrated makes it possible to produce continuously a prepolymer 153 at the outlet of the reactor 107 with a concentration of amine end groups (AEG) equal on average to 238.2 meq/kg, and a concentration of acid end groups (CEG) equal on average to 289.5 meq/kg, that is to say a difference between the concentrations of acid function and of amine function of 51.3 meq/kg, for a nominal and desired value of 50 meq/kg.

The prepolymer thus produced is converted into polyamide of the desired molar mass which is compatible with the usual uses by addition to a flow for manufacturing a polyamide obtained from a process for manufacturing polyamide 6,6 starting with hexamethylenediamine adipate salt.

The continuous and usual processes for manufacturing PA 6,6 described, for example, in the book "Polymerization processes" Schildknecht edition (Wiley Interscience, 1977) pp. 424 to 467 (chapter 12 "Preparation of 6,6-Nylon and related polyamides" by Donald B. Jacobs and Joseph Zimmerman) comprise, in the finishing step of the polymer, a flasher, a vapour/prepolymer separator and a finisher. The flow of prepolymer obtained by the process of the invention is added to the conventional flow of polyamide upstream of the flasher.

The addition of this flow of polyamide leaving the process in accordance with the invention does not disrupt the quality or properties of the polyamide obtained leaving the finishing steps. These properties are identical to those of the polyamide manufactured without this additional flow.

The process of the invention thus makes it possible to manufacture a compatible polyamide to be used as a starting material in the usual uses, such as the manufacture of yarns, fibres or films or the manufacture of moulded articles.

The on-line Near InfraRed spectrometric analysis is now described in detail.

The method of measurement by spectrometric analysis in the near infrared spectral region consists in performing a continuous measurement by transmission on the reaction mixture: the light wave is emitted by the spectrometer lamp, conveyed by a single strand of optical fibre to the emitting probe which is directly in contact with the reaction mixture. The light information is partially absorbed by the product passed through and is then captured by the receiving probe which is rigorously aligned with the emitting probe, conveyed via a second single strand of optical fibre and then collected by the spectrometer detector. The spectral acquisition software constitutes the whole transmission spectrum to convert it into an absorbance spectrum. The acquisition of the spectra thus takes place over a range of wave numbers from 4600 to 9000 cm$^{-1}$ with a resolution of 16 cm$^{-1}$: each spectrum results from the average of 32 scans formed at an average speed of 128 scans per minute.

The spectral information collected by continuous analysis is transcribed into a concentration of acid and amine end groups per kg of dry product (CEG and AEG, respectively) and also into a CEG–AEG difference using models produced by calibration with samples analysed by potentiometric analysis methods described, for example, in "Encyclopedia of Industrial Chemical Analysis", 1973, volume 17, page 293.

The assembly of the device for near infrared measurement is rated so as to withstand an internal pressure of 150 bar and a temperature of 300° C. The assembly is composed of an APX4 stainless steel cell provided by the company Ateliers Mecaniques Péagois (AMEP), Péage de Roussillon, France.

The cell body is heated electrically, the heating being controlled by a temperature measurement in the metal bulk and in the polymer. An alarm on the temperature difference makes it possible to detect a fault in the heating device.

The pipe for circulating the analysed product is cylindrical and 1 cm in diameter. This flow is intercepted perpendicularly by the probes directly screwed onto the body of the cell.

The probes used are of the type FCP-080 cross line probe supplied by Axiom Analytical Incorporated, Irvine, Calif. These probes are screwed into the probe holders so as to produce a conical metal-metal seal, the sapphire of about 8 mm being flush with the end of the probe holder. The spacing between the emitting probe and the receiving probe is thus made by a symmetrical adjustment by screwing the two probe holders face to face: it is set at 4 mm and remains constant during the calibration and prediction phases in continuous use. The probes are connected to the spectrometer via an optical fibre measuring up to 50 metres. The spectrometer itself is connected to a computer in an operating room which gives a real-time report of the result of the on-line analysis.

The measurement performed on the mixtures M2 and M3 at the outlet of the reactors 104 and 105 shows a standard error of prediction of 10.1 meq/kg for AEG, 13.0 meq/kg for CEG and 12.7 meq/kg for the difference CEG–AEG with correlation coefficients of greater than 0.99.

The degree of precision achieved by this statistical analysis of the near infrared spectra allows an adjustment of the ratio between the acid end groups and amine end groups in the mixtures M2 and M3 by coupling the flow rates of the fluids fed into the reactors 104 and 105, respectively.

The measurement formed at the outlet of the reactor 107 shows a standard error of prediction of 4.6 meq/kg for AEG, 5.1 meq/kg for CEG and 4.7 meq/kg for the difference CEG–AEG with correlation coefficients of 0.990 for AEG, 0.991 for CEG and 0.995 for the difference CEG–AEG.

The degree of precision achieved by this statistical analysis of the near infrared spectra also allows an adjustment of the ratio between acid end groups and amine end groups by coupling the flows of the mixtures M2 and M3 fed into the premixer or the reactor 107.

Similarly, this analysis method by near infrared spectrometry also makes it possible to determine the composition of the mixture M1 and to couple the flow rates of the monomers fed into the reactor 101.

The placing of the probes in the process may be different depending on the arrangement of the reactors or the presence of storage units or reactors.

The number of analysis points on the process may vary from one to several. Thus, it is possible to have only one monitoring of the composition of the prepolymer leaving the reactor 107 and to couple this measurement to the flow rates of the mixtures M2 and M3 and/or the feed rates of the HMO solution and of the mixture M1 in the reactors 104 and 105, without, however, departing from the context of the invention. However, for better monitoring of the process, it is preferable to monitor the composition of each of the mixtures M1 to M4 and to couple the feed rates of the reagents into each reactor for manufacturing these mixtures.

One example of a system for monitoring and coupling the feed rates of the flows of mixtures into the various reactors is illustrated by the dashed lines in FIG. 1.

As mentioned above, the process of the invention preferentially applies to the manufacture of PA 6,6, but it may also be used for the manufacture of other polyamides obtained from diacid and diamine monomers, and especially for the manufacture of copolyamides, for instance copolyamides PA 6,6/6.

The starting operations and the transient states of the products and process parameters before obtaining the permanent regime described above are now described.

The start-up uses the N salt at a concentration of 62%. It is prepared from a source of water 254, adipic acid 252 and hexamethylenediamine 251.

Figure 2:
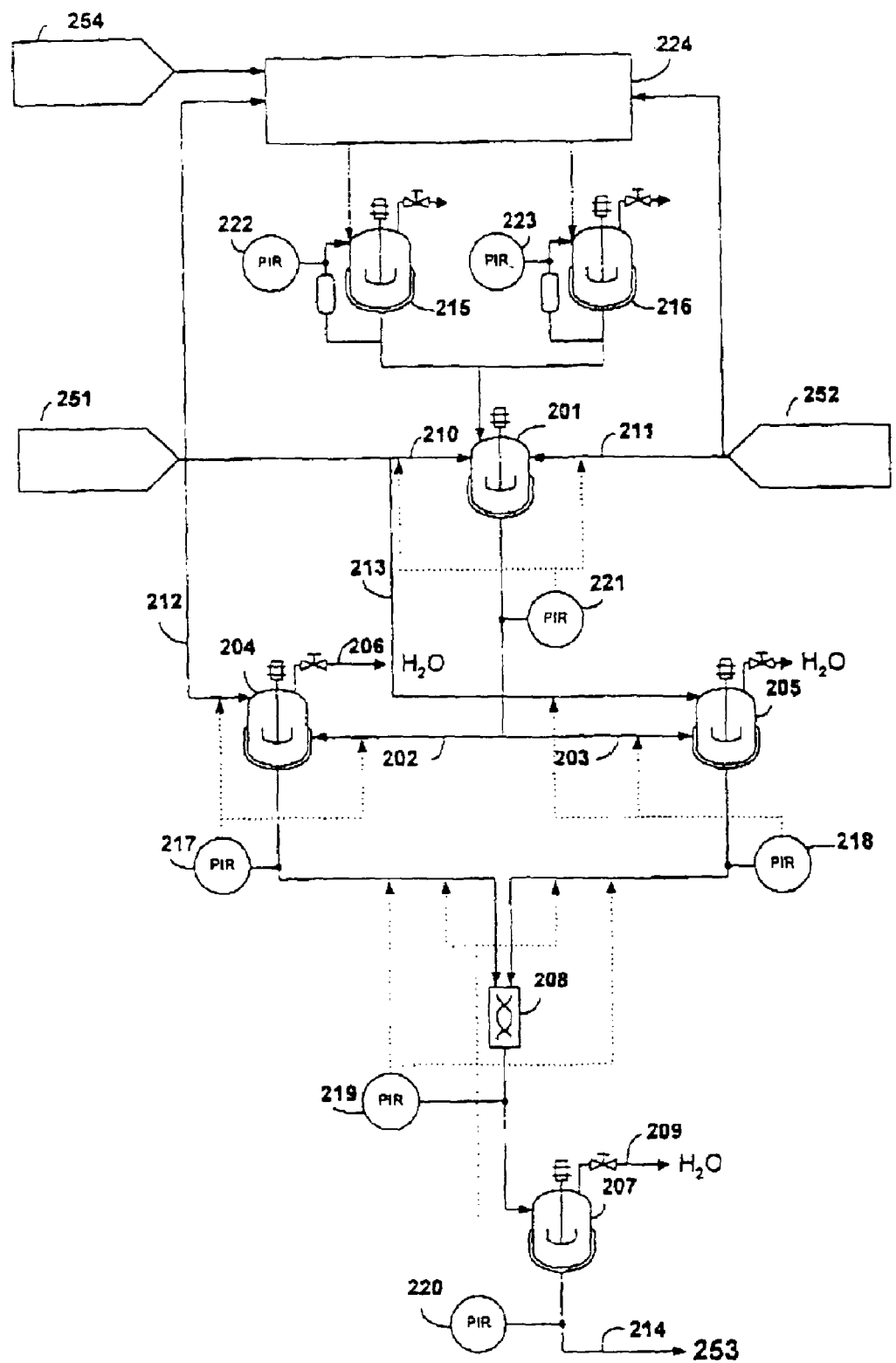

In the example illustrated, the detailed description of which is given with reference to FIG. 2 which represents a synoptic diagram of a part of the process of the invention, the solution of N salt at a concentration of 62% is manufactured in the workshop 224. This workshop is fed continuously via at least two buffer tanks of the type 215 and 216 which empty alternately by respiration between a maximum level and a minimum level. These nitrogen-inertized tanks are equipped with a means of stirring by external recycling so as to homogenize the content therein and to monitor the pH and the concentration therein before feeding the polycondensation unit.

State 1: Filling of the Plants

After the usual water tests preceding the start-up of the polycondensation plant, the water feed is replaced with a feed of a 62% N salt solution introduced continuously at 109° C., at a flow rate of 280 I/h (≅300 kg/h), into the reactor 201 and then into the assembly of the cascade of stirred reactors 204, 205 and 208. The outlet valves of the various reactors are closed in a first stage, to allow them to fill, and then opened. The plants comprise means for adjusting the levels. The flow of exiting solution is reintroduced into the plants. The reactors function at the feed temperature of the 62% N salt under a virtually atmospheric autogenous pressure of 1.05 bar to avoid the introduction of oxygen.

Stage 2: Establishment of the Operating Regime in the Plants in the Future State of the Reactor 201 in the Permanent Regime After stabilizing the levels during the preceding step, the continuous feed rate of 62% N salt is reduced to 110 I/h (~120 kg/h) so as to allow the concentration of the 62% N salt to [lacuna] 75% with the aid of heat-exchange surfaces arranged in each of the stirred reactors. To do this, the nominal temperatures in the reactors 201, 204, 205 and 207 are set at 115° C. The corresponding autogenous pressure is then adjusted to 1.05 bar.

State 3: Establishment of the Operating Regime in the Reactors 204, 205 and 207 in the Future State of the Reactors 204 and 205 in the Permanent Regime After stabilizing the levels and temperatures during the preceding step, the nominal temperatures are adjusted to 180° C. in the reactors 204, 205 and 207. The autogenous pressure is then adjusted to 5 bar. The concentration of the N salt in the reactor 207 is 88%. This step is immediately linked into the following step as soon as the temperature of 180° C. is reached in the reactor 207.

State 4: Establishment of the Operating Regime in the Reactor 207 in the Final State of the Reactors 204 and 205 in the Permanent Regime Once the nominal temperature of 180° C. has been reached in the reactor 207, this temperature is adjusted to 227° C. The autogenous pressure is then adjusted to 15 bar.

State 5: Establishment of the Operating Regime in the Reactors 204, 205 and 207 in Their Final State (Fed With N Salt Solution)

The nominal temperatures are adjusted to 228, 226 and 248° C., respectively, for the reactors 204, 205 and 207. The autogenous pressures are then adjusted to 15 bar in the reactors 204 and 205 and 17.5 bar in the reactor 207. The number-average molar mass measured on a dry extract of the flow leaving the reactor 207 is about 4 000 g/mol. This flow continuously feeds the downstream of the polycondensation process consisting of a combination in series of a flasher, a vapour/prepolymer separator and a finisher. The polymer obtained at the finisher outlet has a viscosity index measured in dilute formic acid in accordance with the conditions and recommendations of the international standard ISO 307-1984 of 135 ml/g.

The product leaving the cascade of stirred reactors is the prepolymer which gives, after rising in bulk, a polymer whose viscosity index is suitable for most conversion applications, either directly on leaving the finisher, or after granulation followed by remelting.

This step is advantageously used to calibrate the points for measuring the stoichiometry by near infrared, such as a description thereof is given in Example 2.

State 6: Final State Corresponding to the Permanent Regime

When all of the near infrared measuring points have been calibrated and when the spectrometer has thus been calibrated, in a precise and reliable manner to allow the direct amidation process to be conducted, the feed of 62% N salt into the reactor 1 is replaced with a continuous feed at 90 kg/h of the mixture M1 described above.

The adjustment of the stoichiometry using the on-line near infrared measurements is activated on the assembly of cascade reactors: the coupling between the adjustment of the stoichiometry of the exit flow and the adjustment of the level in each of the reactors 201, 204, 205 and 207 allows the flow rates of the two feed flows of each of the reactors to be adjusted, one of these flows being systematically rich in amine functions and the other rich in acid functions.

This mode of start-up of the direct amidation process using an aqueous solution of monomers makes it possible to achieve the permanent regime described at the start of this Example 1 by allowing the calibration of the points for measuring the stoichiometry by near infrared and by minimizing, in the calibration and standardization phases, the risks of producing non-specification polymer.

EXAMPLE 2

Example of a Procedure for Calibrating a Near Infrared Spectrometer to Carry Out the Process Devices and procedures relating to the near infrared analysis and the calibration of the spectrometer are described in this example.

First Branch Loop

Although the measurement can be carried out on the main product circulation pipe, the measurement is carried out on a branch loop.

Second Branch Loop

A second, closed, branch loop connected to the first loop is used. This loop makes it possible to standardize and calibrate the near infrared spectrometer.

Calibration Procedure

The product obtained from the condensation using the N salt, the characteristics of which are known, is recovered in the second branch loop. With the second branch loop connected to the spectrometer, the spectrometer is calibrated in the desired range using reference measurements produced from samples taken from the loop, following various dosed additions of known amounts of adipic acid and/or of hexamethylenediamine (dosed addition method) in the loop.

EXAMPLE 3

Another embodiment of a process according to the invention.

The plants and the functioning in a permanent regime are first described.

Figure 3:
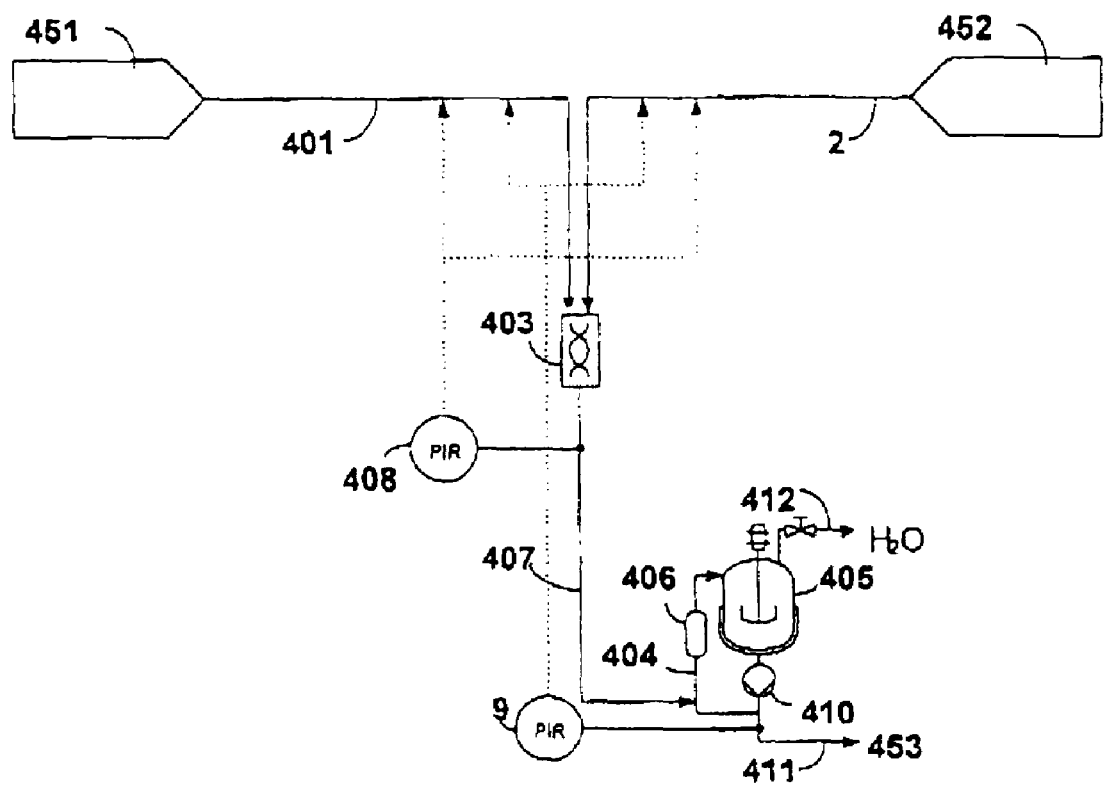

According to the scheme represented in FIG. 3, into a zone consisting of a combination in series of static mixers 403 are continuously fed, via the pipes 401 and 402, respectively, a flow of hexamethylenediamine melt obtained from a source 451, and a flow of deoxygenated adipic acid melt at a temperature of 250° C. under a pressure of about 15 bar, obtained from a source 452. The mixture obtained is referenced M5. The stoichiometry of the reaction mixture is measured continuously by near infrared in the flow 407 leaving the mixing zone 403: the flow rates of the flows 401 and 402 are then adjusted so as to regulate the nominal value of the molar ratio of the near infrared measuring point 408.

The mixture M5 is introduced into the recycling loop of a stirred reactor 405: this loop is equipped with a heat exchanger 406 and provides via the pump 410 a recycling flow rate which is 20 times as great as the feed rate of the mixture M5. The reactor 405 operates at a temperature of 255° C. under a pressure adjusted to 15 bar. It is equipped with an external device for partial recovery of the losses of volatile diamine entrained by the steam, not represented in FIG. 3. The filling level is such that the estimated residence time is about 20 minutes.

A fraction of the flow leaving the reactor 405 is removed via the pipe 411. A continuous near infrared measurement point located in this pipe 411 makes it possible to monitor the stoichiometry and the chemical progress of the product. If need be, it assigns a new nominal value to the near infrared measurement point 408 located on the pipe 407.

The prepolymer 453 thus produced is converted into polyamide of desired molar mass which is compatible with the usual uses by addition to a polyamide manufacturing flow obtained from a process for manufacturing polyamide 6,6 using hexamethylenediamine adipate salt.

The continuous and usual processes for manufacturing PA 6,6 described, for example, in the book "Polymerization processes", Schildknecht edition (Wiley Interscience, 1977), pp. 424 to 467 (chapter 12, "Preparation of 6,6-Nylon and related polyamides" by Donald B. Jacobs and Joseph Zimmerman) comprise in the polymer finishing step, a flasher, a vapour/prepolymer separator and a finisher. The flow of prepolymer obtained by the process of the invention is added to the conventional flow of polyamide upstream of the flasher.

An alternative may also consist in passing the reaction mixture through a flasher, a finisher classified as being of low viscosity, from which the prepolymer leaves with a viscosity index, measured in dilute formic acid in accordance with the conditions and recommendations of international standard ISO 307-1977 in the region of 60 ml/g, so as to be able to be granulated. A drying operation accompanying a post-condensation in solid form then makes it possible to achieve the required level of viscosity for the polymer.

The method of measurement by spectrometric analysis in the near infrared spectral region is performed in a manner which is entirely similar to the description in Example 1. This on-line measurement is carried out at all the relevant points of the plant and more particularly at points 408 and 409 represented in FIG. 3.

The start-up operations and the transient states of the products and process parameters before obtaining the permanent regime described above are now described.

The start-up uses N salt at a concentration of 62%. It is prepared from a source of water 554, adipic acid 552 and hexamethylenediamine 551.

Figure 4:
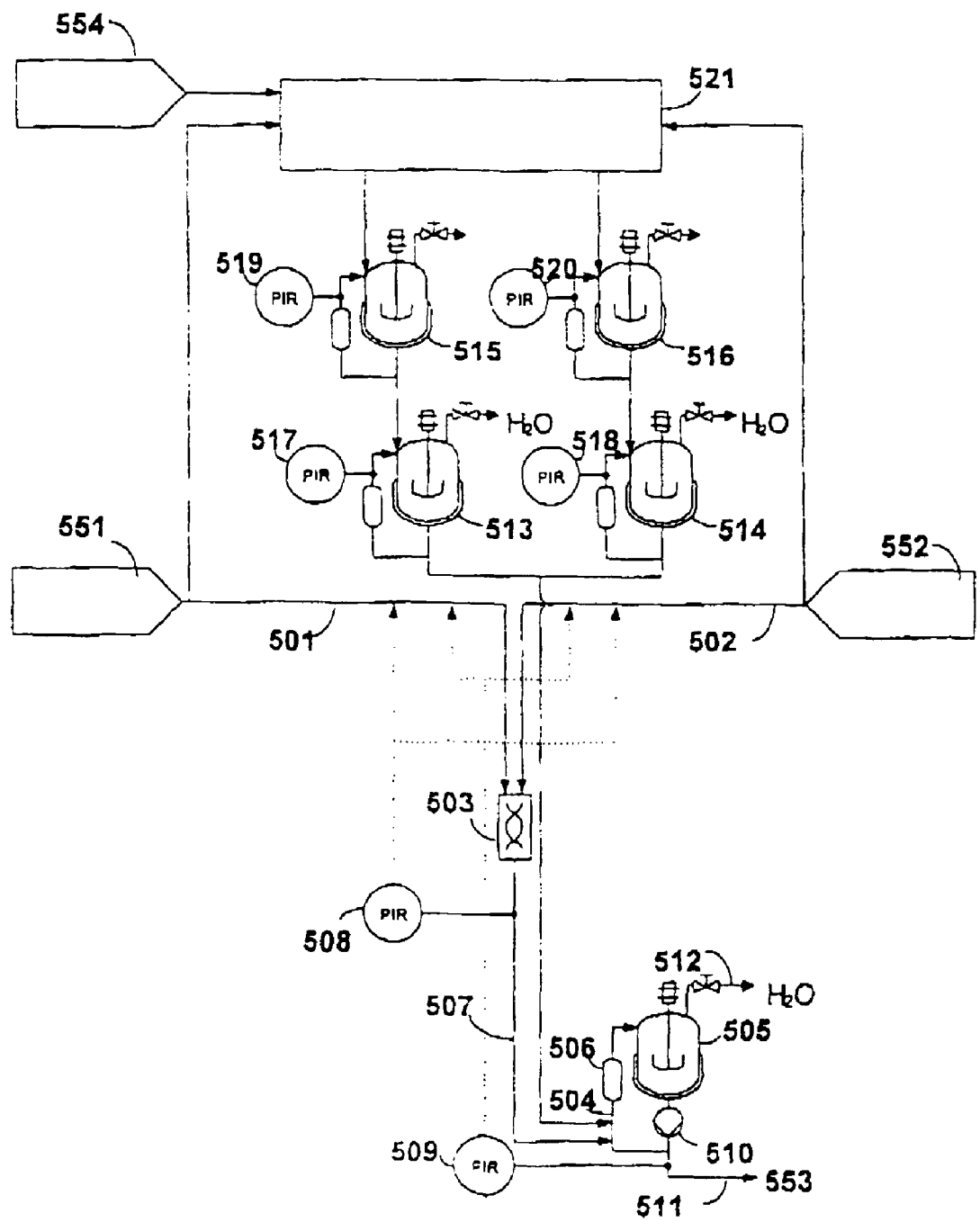

In the example illustrated, the detailed description of which is given in reference to FIG. 4 which represents a synoptic diagram of one part of the process of the invention, the solution of N salt at a concentration of 62% is manufactured in the workshop 521. This workshop is fed continuously via at least two buffer tanks of the type 515 and 516 which empty alternately by respiration between a maximum level and a minimum level. These nitrogen-inertized tanks are equipped with a mode of stirring by external recycling to homogenize the content and to monitor the pH and the concentration therein before feeding into the polycondensation unit.

State 1: Filling of the Plants

After the usual water tests preceding the start-up of the polycondensation plant, the water feed is replaced with a feed of a 62% N salt solution introduced at 109° C., into one of the two stirred reactors 513 and 514. These two reactors are equipped with a recycling loop consisting of a pump, a heat exchanger and a near infrared measurement point. Coupled to the buffer tanks 515 and 516, they operate alternately so as to continuously feed the stirred reactor 515 via its recycling loop 504.

State 2: Establishment of the Operating Regime in the Reactors 513 and 514 Under the Conditions of the Permanent Regime After stabilizing the levels during the preceding step, the nominal temperatures in the reactors 513, 514 and 505 are set at 180° C. The corresponding autogenous pressure is then adjusted to 6 bar absolute.

The concentration of the N salt leaving the reactor 505 is 90%.

State 3: Establishment of the Operating Regime in the Reactor 505 Under the Conditions of the Permanent Regime (Feeding With N Salt Solution)

Once the nominal temperature of 180° C. has been reached in the reactor 505, this temperature is adjusted to 260° C. therein and the levels are adjusted so as to obtain an estimated residence time of about 40 minutes. The autogenous pressure is then adjusted to 15 bar. The number-average molar mass measured on a dry extract is about 3800 g/mol. This flow continuously feeds the downstream of the polycondensation process consisting of a combination in series of a flasher, a vapour/prepolymer separator and a finisher. The polymer obtained at the finisher outlet has a viscosity index, measured in dilute formic acid in accordance with the conditions and recommendations of international standard ISO 307-1984, of 130 ml/g.

The product leaving the cascade of stirred reactors is the prepolymer which gives, after increasing in mass, a polymer with a viscosity index that is suitable for most of the conversion applications, either directly to the finisher outlet, or after granulation followed by remelting.

This step may advantageously be used to calibrate the points for measuring the stoichiometry by near infrared as a description thereof is given in Example 2.

State 4: Final State Corresponding to the Permanent Regime (Feeding with Monomer Melts)

When all of the near infrared measurement points have been calibrated, and the spectrometer has thus been calibrated, in a precise and reliable manner to allow the process in permanent regime to be conducted, the feed of 62% N salt into the reactor of type 513 or 514 is replaced with a continuous feed of the mixture M5 as described previously into the mixing zone 503. The residence time is adjusted to about 20 minutes.

The adjustment of the stoichiometry from the on-line measurements by near infrared is activated: the coupling between the adjustment of the stoichiometry of the flow leaving the reactor 505 and its level adjustment makes it possible to adjust the flow rates of the two feed flows 501 and 502.

This start-up mode of the direct amidation process using an aqueous monomer solution makes it possible to achieve the permanent regime described at the start of this Example 3 by allowing the calibration of the points for measuring the stoichiometry by near infrared and by minimizing, in the calibration phase, the risks of production of non-specification polymer.

For the measurements by near infrared spectrometry and the calibration, the primary and secondary branch device described in Example 2 is used.

This calibration procedure may be used judiciously at any of the measurement points 508, 509, 517, 518, 519 or 520 mentioned in FIG. 4 for the on-line monitoring of the stoichiometry, or even of the water content, irrespective of the degree of progress of the polycondensation, from the monomers and the N salt up to the prepolymer leaving the final reactor and, further downstream, to the polymer leaving the finisher.

The invention claimed is:

1. A process for the continuous manufacture of polyamide, starting with dicarboxylic acids and diamines, comprising, in a permanent regime, the following steps:
   (1) a starting phase,
   (2) continuous mixing of two flows of polyamide precursors, one flow rich in acid end groups, and one flow rich in amine end groups,
   (3) condensation of the mixture of the two flows, the mixing and condensation being carried out in the same plant or in different plants,
   (4) recovery of a flow of product obtained from the condensation operation, at least one flow rate of the flows of precursor being coupled to the result of an analysis of the contents of acid and amine end groups in the mixture, the condensation medium, or the recovered flow, so as to keep these contents and/or their ratio between two nominal values,
   wherein said starting phase comprises the following steps:
      feeding to the condensation plant an aqueous solution comprising dicarboxylate ions and diammonium ions, in proportions such that their molar ratio is between 0.99 and 1.01,
      establishing an operating regime in the condensation plant under temperature and pressure conditions such that there is condensation starting with the dicarboxylate ions and the diammoniun ions initially included in the aqueous solution,
      recovery of a flow of the condensation product, and
      supplying a flow of said precursors and activating the analysis and coupling of the flows.

2. Process according to claim 1, wherein the flow of recovered product is fed into flashing and/or finishing plants so as to obtain a polyamide with a desired degree of polymerization.

3. Process according to claim 1, wherein the condensation using the aqueous solution is performed at a temperature above 180° C., at a pressure above 5 bar, the product recovered having a degree of polycondensation of greater than 10, and in that the temperature and pressure are identical to the temperature and pressure in the permanent regime.

4. Process according to claim 1, wherein the analysis is performed by Near InfraRed spectrometry.

5. Process according to claim 4, wherein at least some of the flow of the condensation product from the solution is recovered and used to calibrate the Near InfraRed spectrometer in the desired range of contents of end groups and/or ratios of contents, the feeding with two flows, the analysis and the coupling being activated after this operation.

6. Process according to claim 4, wherein the calibration is carried out by the method of dosed additions into the part of the flow recovered for this purpose.

7. Process according to claim 1, wherein the diacid monomers are selected from the group consisting of adipic acid, glutaric acid, suberic acid, sebacic acid, dodecanedioic acid, isophthalic acid, terephthalic acid, azelaic acid and pimelic acid.

8. Process according to claim 1, wherein the diamine monomers are selected from the group consisting of hexamethylenediamine, heptamethylenediamine, octamethylenediamine, nonamethylenediamine, decamethylenediamine, 5-methylpentamethylenediamine, undecamethylenediamine, dodecamethylenediamine and xylylenediamine.

9. Process according to claim 1, wherein the diacid monomer comprises at least 80 mol % of adipic acid.

10. Process according to claim 1, wherein the diamine monomer comprises at least 80 mol % of hexamethylenediamine.

11. Process according to claim 1, wherein:
   the flow which is rich in acid end groups is a mixture M2 of diacid and of diamine with a diacid/diamine molar ratio of between 1.005 and 1.2
   the flow which is rich in amine end groups is a mixture M3 of diacid and of diamine with a diacid/diamine molar ratio of between 0.8 and 0.995
   the two flows are fed in melt form into a stirred polymerization reactor in which the condensation is carried out
   the condensation product is a prepolymer fed into flashing and/or finishing steps to obtain the desired degree of polymerization.

12. Process according to claim 11, wherein the two flows are mixed together before feeding into the condensation plant.

13. Process according to claim 11, wherein the polymerization reactor operates under an autogenous pressure or an adjusted pressure.

14. Process according to claim 11, wherein the precursors M2 and M3 are obtained, in a permanent regime, by mixing a solution of diamine monomer with a mixture M1 which is rich in diacid monomer.

15. Process according to claim 14, wherein at least one of the flow rates of the flows for introducing diamine monomer solution and mixture M1 which is rich in diacid monomer is coupled to the result of the continuous analysis of the acid and amine functions in the precursors M2 and M3.

16. Process according to claim 11, wherein the precursors are prepared in a permanent regime by mixing a flow of hexamethylenediamine with an adipic acid/hexamethylenediamine eutectic mixture.

17. Process according to claim 15, wherein the precursors are prepared by a process comprising the following steps:
   feeding each of the precursor preparation plants with an aqueous solution comprising dicarboxylate ions and diammonium ions in proportions such that their molar ratio is between 0.99 and 1.01
   establishing the operating regime in the precursor preparation plants under the temperature and pressure conditions of the permanent regime
   in each of the precursor preparation plants, feeding a flow of mixture M1 which is rich in diacid monomer, a flow of hexamethylenediamine, activation of the coupling of at least one of the flows, feeding the product obtained into the mixing or condensation plant.

18. Process according to claim 15, wherein the eutectic mixture M1 is prepared by mixing a flow of adipic acid melt or solid, and a flow of hexamethylenediamine in pure form or in the form of a concentrated aqueous solution, with coupling of at least one of the flows to the result of the analysis of the content of acid and amine groups in the mixture M1, the process comprising the following steps:

feeding the plant for preparing the eutectic mixture with an aqueous solution comprising dicarboxylate ions and diammonium ions, in proportions such that their molar ratio is between 0.99 and 1.01 establishing the operating regime under the temperature and pressure conditions of the permanent regime feeding a flow of adipic acid, a flow of hexamethylenediamine, activation of the coupling of at least one of the flows, feeding the product obtained into the precursor preparation plants.

19. Process according to claim 1, wherein:

the flow which is rich in acid end groups is a dicarboxylic acid in melt form, the flow which is rich in amine end groups is a diamine in pure form or in the form of a concentrated aqueous solution.

20. Process according to claim 18, wherein the diacid is adipic acid and the diamine is hexamethylenediamine.

* * * * *